Figure 6:
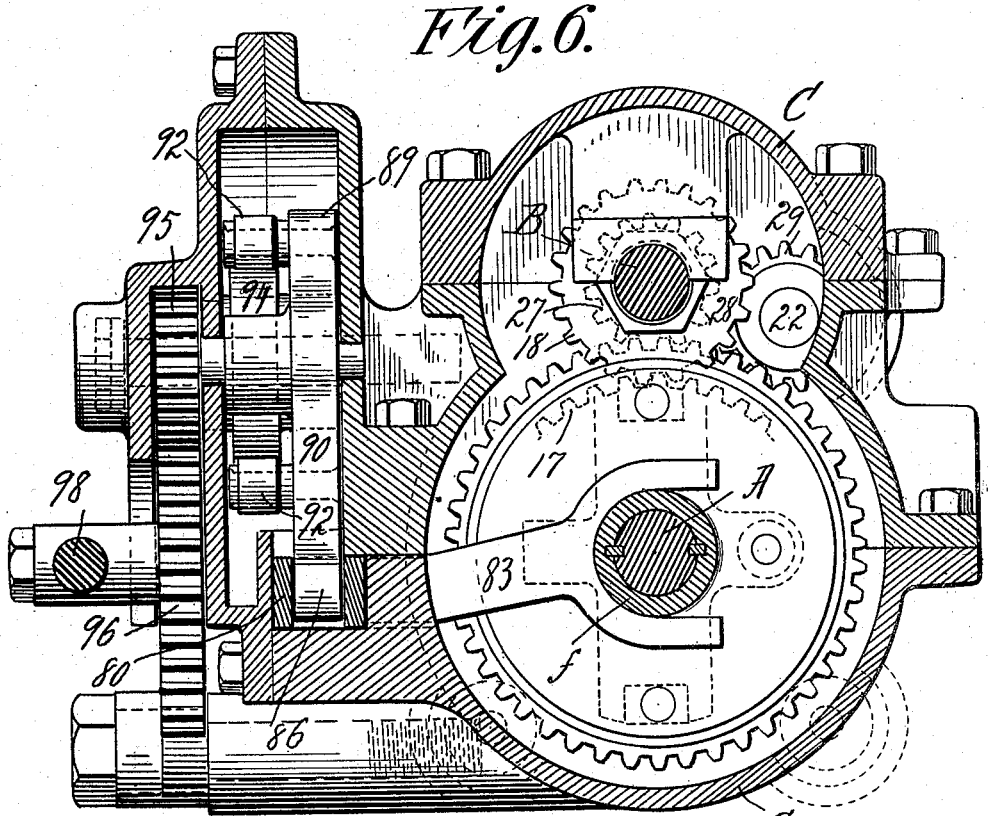

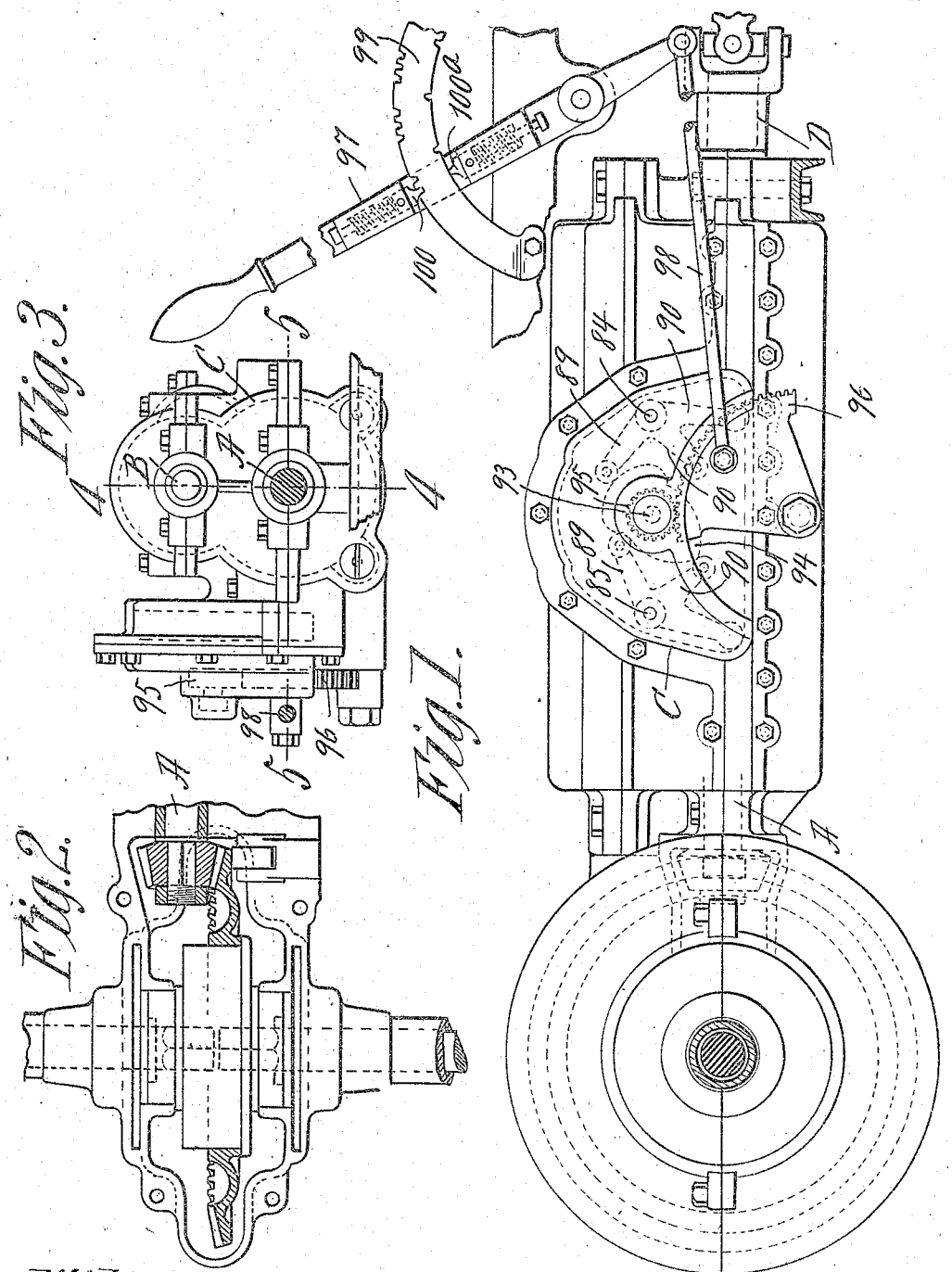

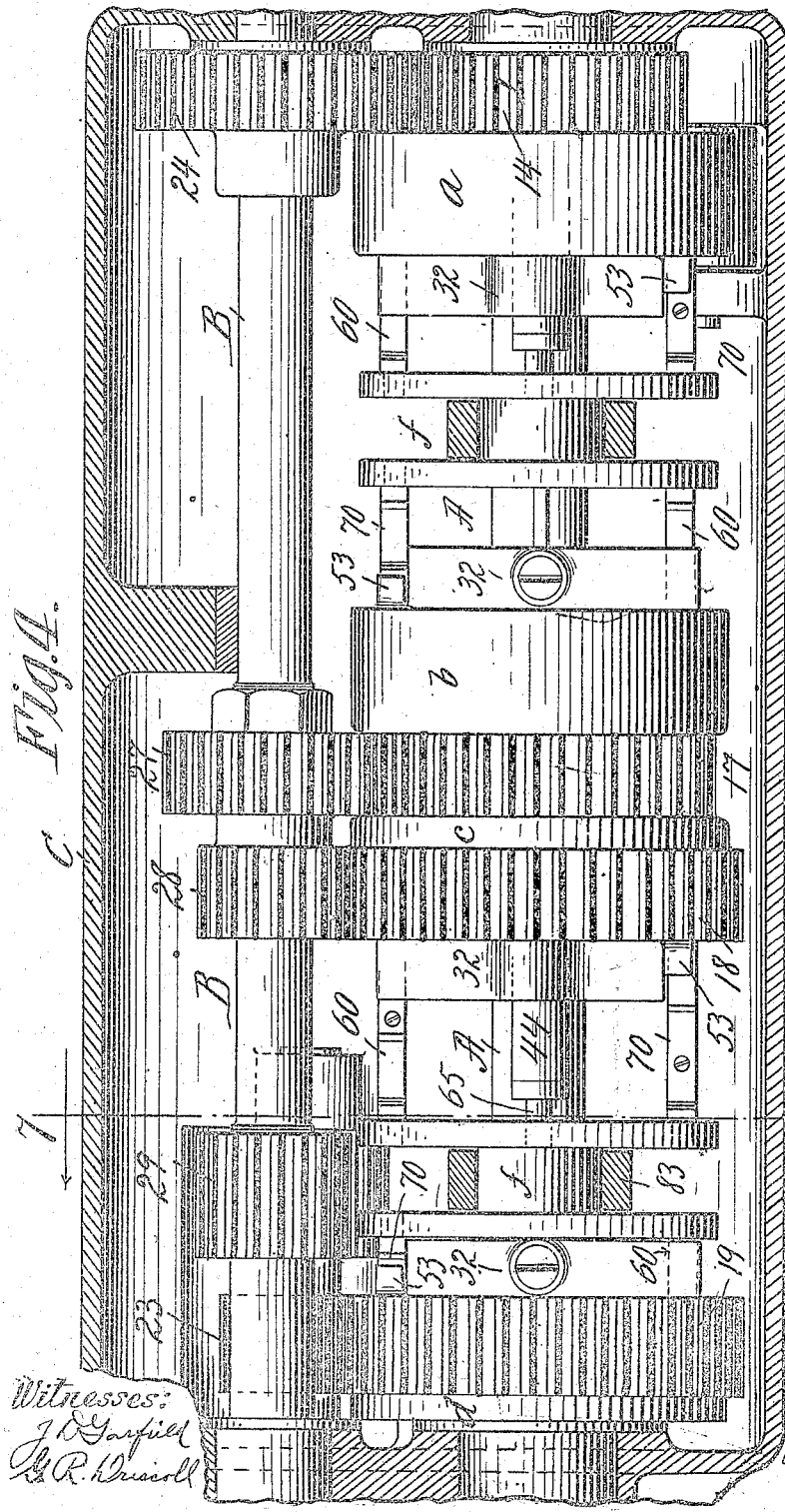

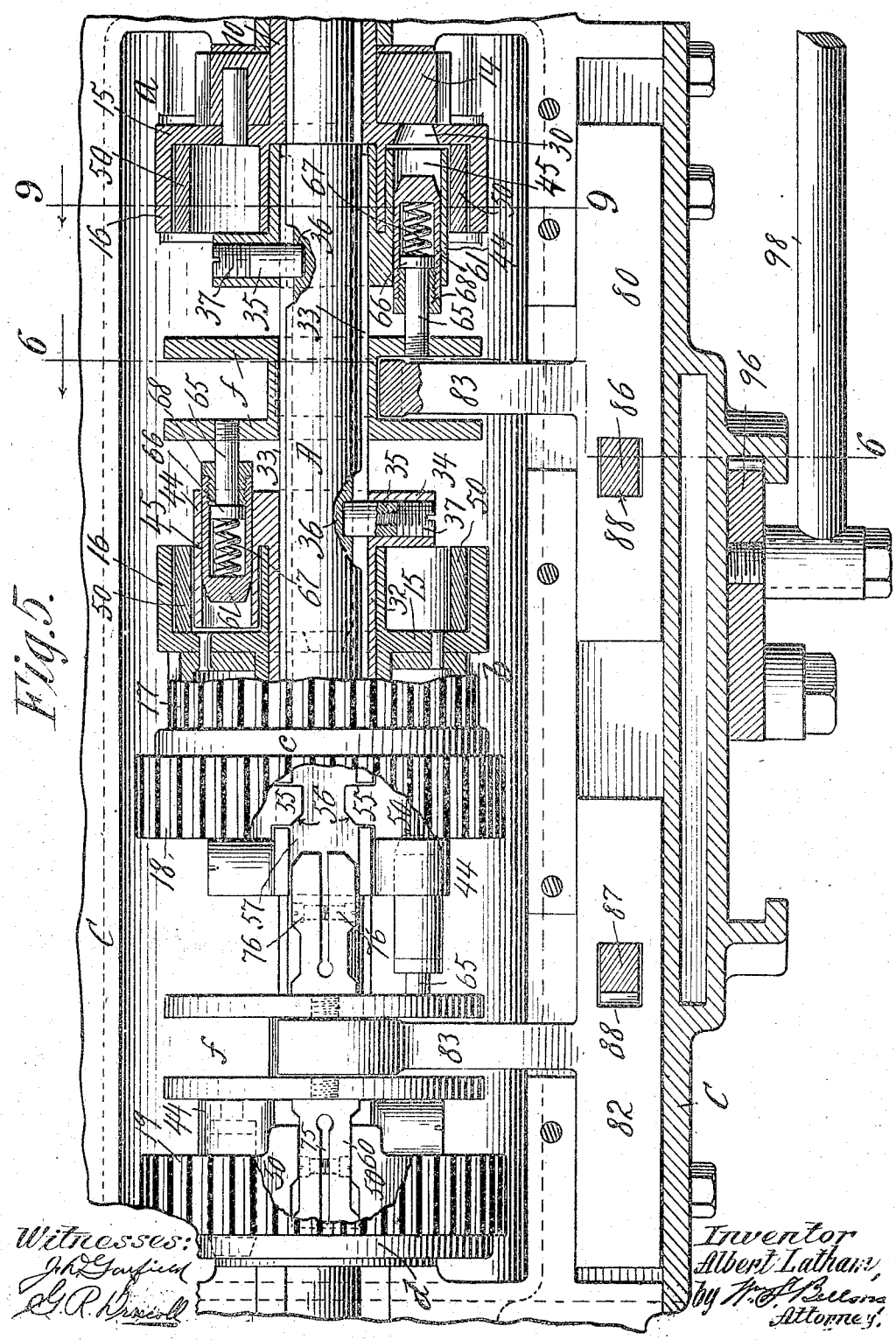

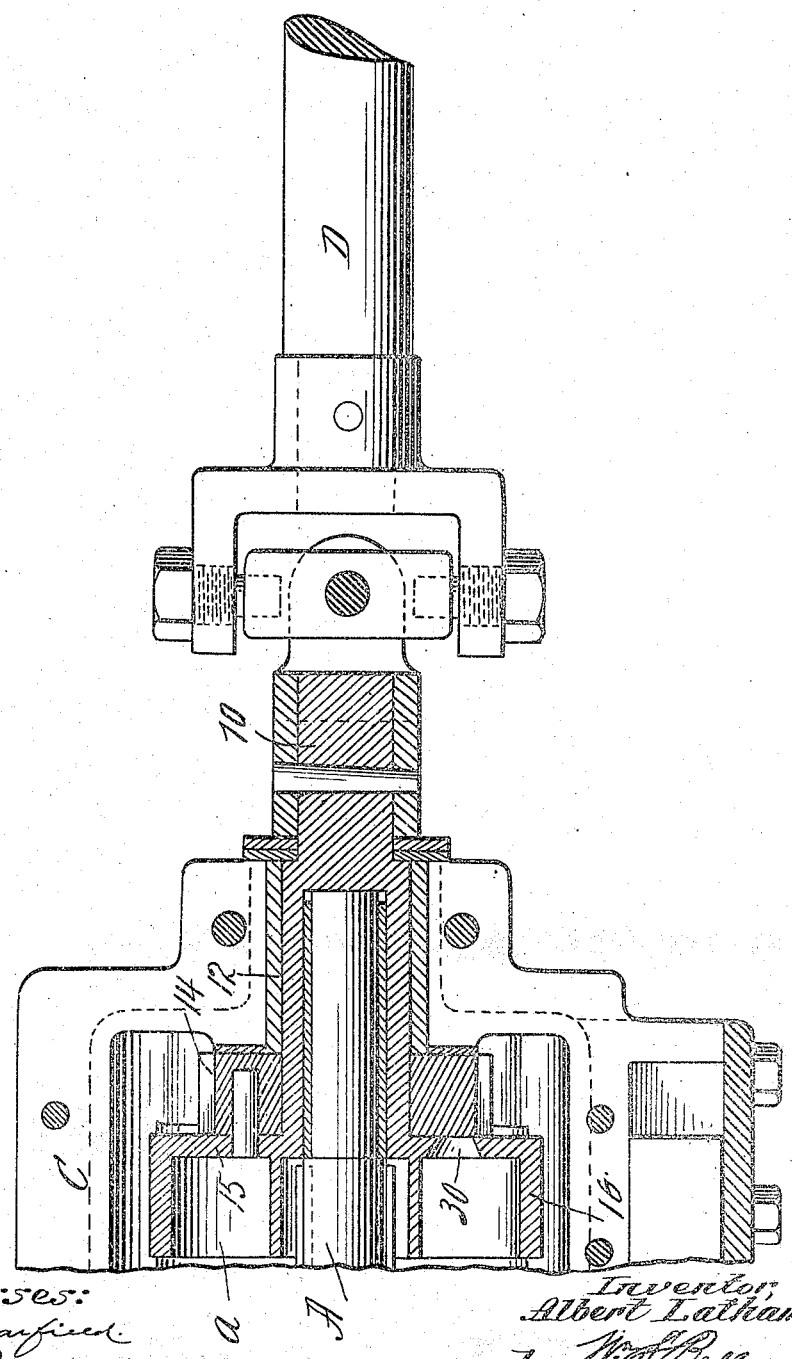

A. LATHAM.
VARIABLE SPEED TRANSMISSION MECHANISM.
APPLICATION FILED FEB. 26, 1906.

900,675.

Patented Oct. 6, 1908.
7 SHEETS—SHEET 5.

A. LATHAM.
VARIABLE SPEED TRANSMISSION MECHANISM.
APPLICATION FILED FEB. 26, 1906.
No. 900,675.
Patented Oct. 6, 1908.
7 SHEETS—SHEET 6.
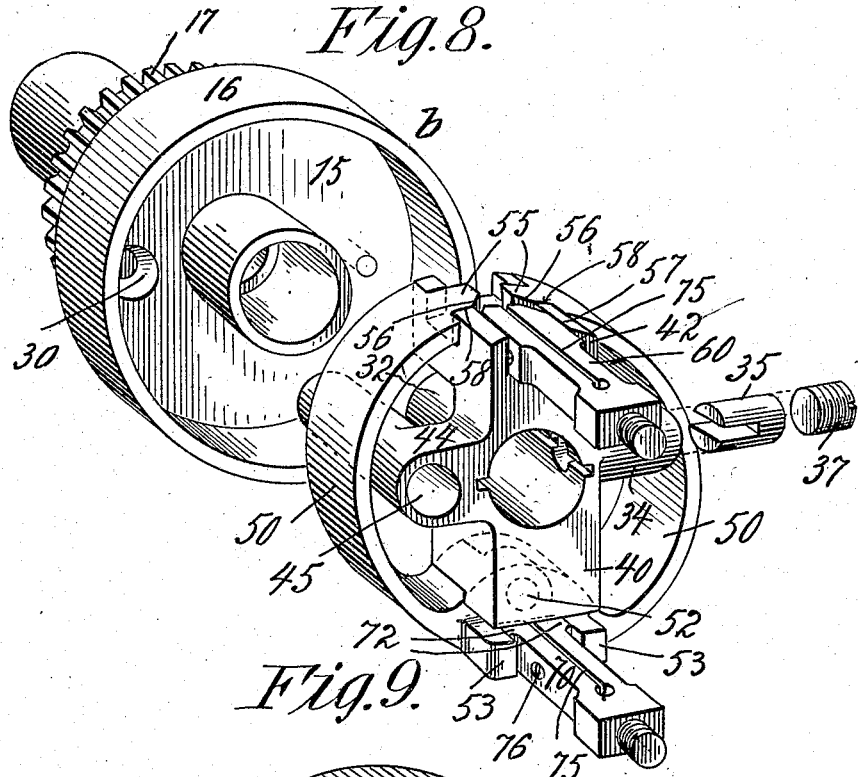
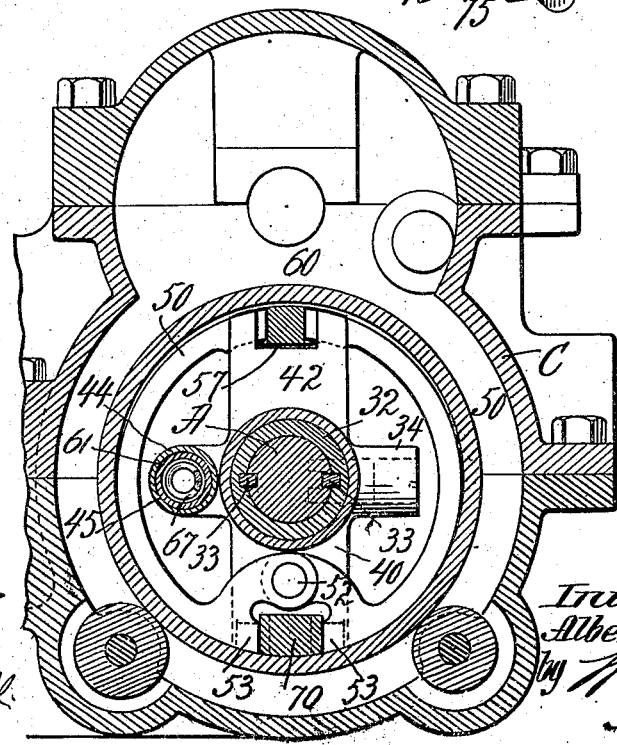
Witnesses:
J. D. Garfield
G. R. Driscoll
Inventor,
Albert Latham
by Wm. F. Bellows
Attorney.

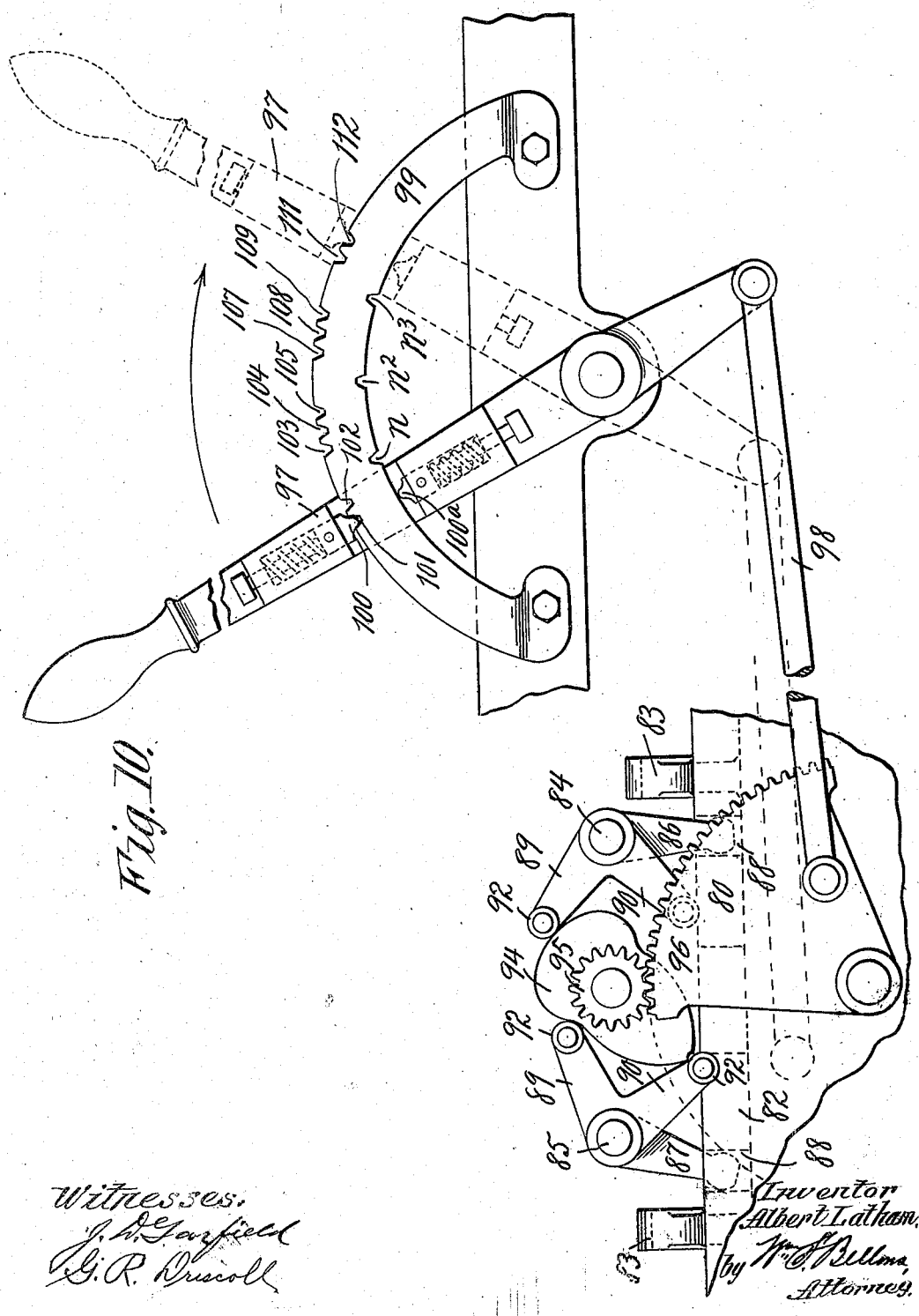

BEST AVAILABLE COPY

UNITED STATES PATENT OFFICE.

ALBERT LATHAM, OF WALTHAM, MASSACHUSETTS, ASSIGNOR OF ONE-HALF TO JAMES W. NOURBOURN, OF SOMERVILLE, MASSACHUSETTS.

VARIABLE-SPEED TRANSMISSION MECHANISM.

No. 900,675.

Specification of Letters Patent.

Patented Oct. 6, 1908.

Application filed February 26, 1906. Serial No. 303,118.

*To all whom it may concern:*

Be it known that I, ALBERT LATHAM, a citizen of the United States of America, and resident of Waltham, in the county of Middlesex and State of Massachusetts, have invented certain new and useful Improvements in Variable-Speed Transmission Mechanism, of which the following is a full, clear, and exact description.
This invention relates to improvements in variable speed transmission mechanism, such as most extensively employed in automobiles,—and elsewhere used,—of a kind including a transmission shaft, another shaft having connection with the driving power and variable speed and reversing gearing in sets, any one of which may be clutch connected to constitute a driving medium at proper speed and desired direction between the shaft in connection with the power, and the shaft through which the motion is transmitted to the traction wheel or wheels of the automobile, or to other part or mechanism to be variably or reversibly driven.
The new mechanism of this invention is characterized by provisions for, and capability of, the utmost "flexibility" in the operation, that is the starting of the motion of the transmission shaft, after the latter has been at rest, and the changing of its driving motion from one speed to another, either faster or slower, or in a reversed direction, are gradual, and yet sufficiently rapid,—all violence, or jolting or gear-tooth-grinding, or other destructive action, being absolutely avoided, which avoidance as known is not the case generally with sliding-gear speed changing and reversing transmission mechanism, or a transmission mechanism comprising clutches constructed merely with interengaging and disengaging teeth.

The invention in part consists, in a variable speed transmission mechanism, of a transmission shaft, a countershaft and means for driving it, clutch members on the transmission shaft and normally free for rotation independently thereof, variable speed gearing, and also generally a reversing gearing, in sets, connecting the countershaft and said clutch members, fellow clutch devices carried by and non-rotative relatively to the transmission shaft, and each comprising a frictionally engaging shoe or member, and a locking member, and for coaction with the respective first named clutch members, means for placing any one of the several friction shoes into and out of engagement with the respective clutch member with which it coacts, and means for additionally placing the locking member of the given clutch device into engagement with its clutch member, and for withdrawing it therefrom.

The invention furthermore consists in various combinations or arrangements of parts, and the construction of certain of the parts, all substantially as hereinafter fully described and set forth in the claims.

The mechanism while embodying the essentials of this invention may be organized so as to provide for a greater or less number of speed changes for the transmission shaft and a reversed driving thereof at any desired speed; and in the illustrations and description of the mechanism here provided, provision is made for a comparatively high and intermediate and a comparatively slow forward driving of the transmission shaft and for a slow reversed driving of such shaft.

Figure 7:
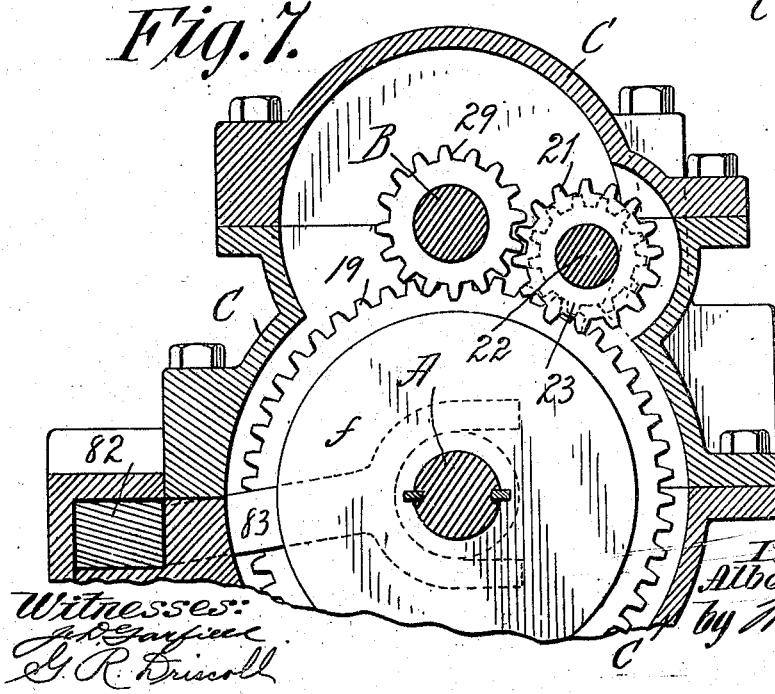

In the accompanying drawings,—Figure 1 is a side elevation of the incased transmission mechanism, a portion of the engine, or primary motive power, shaft, and the compensation gearing through which the divided axle for an automobile may be driven. Fig. 2 is a plan view showing, partly in section, however, the connection of the transmission shaft with the compensation gearing,—the latter comprising no especial novelty. Fig. 3 is an elevation as seen at the right hand end of Fig. 1, the engine shaft being represented in cross section. Fig. 4 is a sectional elevation of the variable speed transmission mechanism, the inclosing casing being shown in vertical section as taken on the line 4—4, Fig. 3. Fig. 5 is substantially a horizontal longitudinal sectional view taken on the line 5—5, Fig. 3,—a left hand portion of the mechanism being shown by full lines in plan view,—fragments, however, being broken away for clearer illustration. Fig. 5ª is a horizontal sectional view of the right hand portion of the mechanism, some of which is included in Fig. 5, and showing the feature of the coupled or jointed engine shaft loosely sleeve engaged about the right hand end of the transmission shaft, relatively to which it is independently rotatable. Fig. 6 is a cross sectional view taken on line 6—6, Fig. 5. Fig. 7 is a similar cross sectional view taken on line 7—7, Fig. 4, and more particularly showing the gearing for the reversed driving. Fig. 8 is a perspective view showing the parts, in separated relations, of one of the clutches. Fig. 9 is a vertical cross sectional view on line 9—9, Fig. 5. Fig. 10 is a side elevation of the mechanism which controls the positions and conditions of all of the clutches, whereby none thereof may constitute a medium of connection between the power driven countershaft and the transmission shaft, or whereby any of the clutches may be set.

Similar characters of reference indicate corresponding parts in all of the views.

In the drawings,—A represents the transmission shaft and B the countershaft above and parallel with the shaft A, both said shafts and the gearing clutches and devices appurtenant thereto being inclosed within a casing C made in separable sections detachably connected together by bolts,—said casing being constructed at its end with suitable bearings for the support of the shafts.

D represents the engine shaft or motive power shaft in longitudinal alinement with the transmission shaft, and as represented in Fig. 5ª has the universally jointed section 10 thereof which is adjacent and extended through the end of the case C made of tubular or sleeve like form, fitting through the one end journal bearing 12 and receiving for rotation independently therewithin the extremity of the transmission shaft A. The said portion 10 of the engine shaft at its extremity which is extended within the case is constructed with a circular cup shaped combined positive and friction clutch member $a$, unitary with which and with the shaft section 10 is a spur gear wheel 14, it being remembered that the clutch member $a$ and the gear wheel 14 may rotate as one with the engine shaft and independently of the transmission shaft.

In separation at suitable intervals on intermediate portions of the shaft are combined positive and friction clutch members $b$ and $c$ and within the casing near the end of the transmission shaft farthest from its end in bearing within the engine shaft is a fourth circular combined positive and friction clutch member $d$.

All of the combined positive and friction clutch members are of cup shape, two thereof being shown in sectional view in Fig. 5, and each comprises a portion having the form of an annulus, and indicated by the numeral 15, such portion being herein referred to as the clutch member "back", and each member further comprising the annular flange or clutch rim 16.

As the mechanism is organized in detail, the circular clutch member $b$ is made unitary with a spur gear wheel 17 which is located next thereto and riveted to its back, but the clutch members $c$ and $d$ instead of being edgewise adjacent the gear wheels 18 and 19, which are as one therewith, are surrounded by the gear teeth and are made as chambered or cup-like bodies for the gears 18 and 19.

The countershaft D above and parallel with the transmission shaft has thereon gear wheels 24, 27, 28 and 29, meshing respectively with the clutch member gears 14, 17 and 18 and with an intermediate gear 21 on a stud shaft 22 on which is a pinion 23 which in turn meshes into the spur gear wheel 19.

The gear wheels 24 and 14 are of equal size, the gear wheel 27 is somewhat smaller than the gear wheel 17, and the gear wheel 28 is of still further decreased diameter than the gear wheel 27, while the gear wheel 18 in which the one 28 meshes is proportionately larger than the one 17. It is thus seen that power from the engine shaft through gearing 14, 24, driving the countershaft B at the same speed as the engine shaft, will impart a rotary motion to the clutch member $a$ in unison with the engine shaft speed, will impart a slower motion to the clutch member $b$, will impart a still slower motion rotatively to the clutch member $c$ and will impart also a very slow rotary motion in the reversed direction to the clutch member $d$.

For each of the several clutch members $a$, $b$, $c$ and $d$, is a fellow clutch device which is carried revolubly and as one with the transmission shaft (when the latter rotates) and for each of these coacting or fellow clutch devices is a setting or clutch closing means so that selectively any of the circular clutch members free of the transmission shaft (but only one thereof, however, at one time) may be put in clutch with and cause a driving of the transmission shaft and the vehicle or other machine with which said shaft is connected at the rate of speed corresponding to that of the member which is in clutch.

The coacting parts in each set of clutches are constructed and organized for two characters of clutch engagements,—firstly a frictional engagement only, and secondly and additional thereto, a positive locking engagement whereby it becomes possible to initially set the clutch to acquire any given speed or driving of the transmission shaft forwardly or reversely by the engagement only of frictionally binding parts and then to, at pleasure, render the same clutch in condition for the positively interlocking parts thereof to automatically come into engagement.

The details of construction whereby the capabilities last above referred to are fulfilled, are illustrated in Figs. 5, 8 and 9 most particularly, and the description thereof now to be given in respect of one of the clutches is applicable to all of them.

Each of the clutch members $a$, $b$, $c$ and $d$ has in its back 15 a socket 30 axially parallel with the transmission shaft. Adjacent each of the circular clutch members is a support for the coacting or fellow clutch devices, the same comprising a hub 32 fitting over the transmission shaft which is made with the longitudinally continuous spline ribs 33 which are especially provided for the sliding but non-rotatable engagement of the clutch operating collars (hereinafter to be referred to) in relation to the transmission shaft. Each of said hubs has a socketed boss 34 receiving therein a plug 35 endwise recessed to straddle the spline rib 33 of shaft A and entering a socket 36 made transversely within the side of the shaft; and said interlocking plug 35 is confined in place by the screw plug 37 threading into the socketed boss 34.

The hub 32 of the aforesaid support has the radially extending members 40 and 42 in line with each other and the radially extended member 44 at right angles to the line of the members 40 and 42, the portion 44 being elongated in a line parallel with the axis of shaft A and made with a circular bore 45 extending from end to end therethrough.

On the member 40 of the clutch device support a pair of approximately semi-circular friction shoes 50, 50, are connected by a common pivot 52, said shoes having lugs 53 adjacent their connecting pivot, therebelow and in suitable separation.

The position of the friction shoes and cross shaped supporting structure therefor is within the space inclosed by the rim of the proximate circular clutch member so that when the friction shoes are expanded they will bind against the inner surface of the rim 16; and the free ends of the friction shoes are reduced in width, as represented at 55 and are made with beveled corners, as represented at 56. The other end of the portion 42 of the support has a recess 57 thereacross in a line parallel with the transmission shaft, the same being intersected at right angles by another recess 58 in which fit the reduced extremities 55 of the friction shoes. Said recess 57 forms a slideway for the friction shoe expanding bar 60 soon to be more particularly described. In the bore 45 of the aforesaid supporting structure is a longitudinally slidable locking bolt 61 which is made with a solid inner end and otherwise tubular opening to its outer end and formed with an internal screw thread. (See Figs. 5 and 9.)

Each of the clutch devices has for action adjacent thereto and in conjunction therewith a collar $f$ deeply annularly grooved, and while free for endwise play along the transmission shaft which it surrounds, it can have no rotary movement independently of such shaft because of its engagement with the aforesaid spline rib 33. Said collar carries a longitudinally extending stud 65 having a head or a lock enlargement 66 engaged within the tubular bolt 61 and in contact against a spiral spring 67 within the latter and in endwise bearing against the solid inner end of the bolt. An annular plug 68 screw engaging into the threaded orifice of the tubular bolt forms an abutment for the bolt head 66 and yet allows the stud to play endwise inwardly independently relatively to the bolt.

The bolt and alined stud are as far radially offset from the axis of the transmission shaft as is the aforementioned socket 30 in the back of the circular clutch member, as definitely shown in Fig. 5, and in a manner indicated in Fig. 8. The aforesaid collar $f$ carries, as a rigid longitudinal extension thereof parallel with the transmission shaft and alined with the aforementioned recess 57 in the end of the member 42 of the support, the shoe expanding bar 60, the end of which is beveled or made of wedge shape and the end portion of which plays in the aforementioned recess 57; and when the collar is moved in a proper degree towards the back of the circular clutch member, the free end portion of the bar 60 will enter between and expand the friction shoes setting them in their bind against the inner surface of the clutch member flange.

Diametrically opposite but ranging parallel with the friction shoe expanding bar 60 is a friction shoe contracting bar 70, the same having an engagement in suitable time and during the endwise movement of the collar $f$ which carries it with the aforementioned lug 53, with the result of applying through such lug a leverage to swing the friction shoes inwardly and free from bind against the clutch member rim.

It is noted that the points of engagement between the widened end portions 72 of the bar 70 and the points of engagement between the widened end portion of the bar 60 and the free ends of the friction shoes are in different planes or locations so that when the collar is forced to move the bars towards one of the circular clutch members sufficiently far to bring the shoe expander into engagement between the ends of the shoes, a shoe contracting bar will have passed inwardly beyond and out of engagement with the aforesaid lugs 53, and vice versa; and in Fig. 8, the relations of the parts are understood to be those when the collar $f$ is moved endwise away from the clutch member, freeing the shoes so that they may be contracted, the portions 72 of the contracting bar 70 being shown in the engagement with the lever lugs 52 to positively inwardly swing the shoes.

The bars 60 and 70 are made with their extremities of maximum width and narrowed to the rear of such wide portions and the bars are longitudinally split or slotted, as represented at 75 and capable of adjustment, as may be accomplished by the abutting inner ends of screws 76 which oppositely penetrate the portions of the bar at either side of the slot 75.

The clutch mechanism *per se* shown and hereinabove described is made the subject of a separate application for patent filed September 2nd, 1908, Serial No. 451,356.

As shown in the mechanism arranged as here illustrated, one of the sliding collars $f$ appertains to and is made the actuator or controller for the sets of clutches of which the members $a$ and $b$ are parts, and the other collar $f$ at the left of the drawing correspondingly pertains to the other two clutches for the lowest speed and reverse driving,— the arrangement being such that when the left hand collar $f$ is moved from its extreme leftward position to be free of the clutch of the reversely driving gearing it approaches but does not necessarily come into touch with the lowest speed gearing; and a further movement of such collars of the right to bring the lowest speed gearing into clutch will carry such collar and the bars 60 and 70 which had coacted with the friction shoes of the clutch for the reverse gearing further away to the rightward from such clutch. And so similarly the right hand collar may have an intermediate position between the clutch cases $a$ and $b$ so that neither of these parts are in clutch, or it may be moved towards the one to put in clutch further withdrawing the clutch operating parts pertaining to the other clutch therefrom.

It will be understood in the operation of any of the clutches that the collar to secure such operation may have two step like motions, the first from its intermediate, neutral or non-effective position sufficiently far to only set the friction shoes in clutch; and the second and additional movement to force the bolt with a yielding pressure against the back of the clutch member so that in more or less of a rotation of such member the socket 30 thereof on coming around to registry with the bolt will permit the latter under the reaction of its spring 67, in compression between the bolt end and the end of the stud 65, to snap to interlock in the said socket thereby making the positive clutch engagement in addition to the already acquired frictional engagement.

Peculiar to this mechanism, organized as shown, the same may be run for any desired length of time while in frictional clutch thereafter for any desired period while in the additional positive or interlocked clutch and again back on the frictional clutch only for any of the desired speeds. And the controlling means for the collars is such that it will be impossible to change abruptly from one of the speeds to another widely different therefrom, but if running on the lowest speed the highest running speed may not be obtained until after the transmission shaft has been placed in clutch for the intermediate speed; and it is moreover impossible to change from either the highest or intermediate forward driving speeds to the reverse driving without first bringing the transmission shaft into clutch for the lowest forward driving speed. And as an example of a controlling mechanism for the various clutches actuating them through the sliding collars, reference is to be had to Figs. 1, 5, and 10 in which are shown a pair of slides 80 and 82 in endwise alinement opposite and parallel with the transmission shaft, each having a forked arm 83 engaging one of the sliding collars $f$ within the annular groove thereof.

84 and 85 represent rock shafts arranged at the side of the mechanism and having their axes in parallelism and at right angles to the length of the transmission shaft, and these rock shafts have downwardly extending lever arms 86 and 87 engaging in recesses 88 in the respective slides 80 and 82. Each rock shaft 84 has a lever affixed thereon comprising two arms 89 and 90 angular to each other, the arms of one lever being opposite and projecting towards those of the other lever; and each arm carries at its end a friction roller 92.

Centrally between and parallel with the rock shafts 84, 85, is a short shaft or stud 93 having affixed thereon a cam 94 and a pinion 95. The cam as shown in Fig. 10 has the form of an acorn, and according to the positioning thereof correspondingly imparts desired positions to the angular levers, the slides 80 and 82 and the collars $f$ $f$ engaged thereby. A sector gear 96, is pivotally mounted for oscillation on the exterior of the casing C and is in mesh with the aforementioned pinion 95. A controlling lever 97 pivotally mounted on a suitable support by the link or rod 98 connects with the sector gear and said lever has its swinging movement alongside of an arc-shaped plate 99 which is edgewise provided with properly arranged notches for the engagement therein of spring detents 100 and 100ª, which are carried by the lever.

The form or design of the cam 94 and of the angular levers 88, 89, and arrangement for coöperation of these parts, are such that the transmission mechanism may be entirely out of touch or have the clutch devices of one, and one only, pertaining to the gearing for a given direction and speed of driving either in frictional engagement or both frictional and positively interlocked engagement, all of the other clutches except the one selected and put in clutch being free or out of engagement. In the illustrations of this mechanism shown, the positions of the collars $f$ $f$, are by the controlling mechanism such as to place in clutch the reverse slow speed driving gearing for the transmission shaft, this clutching being both of the frictional and positively interlocked character; and this condition is determined by one of the detents 100 of the lever 97 being in the notch 101 of the arc-shaped plate 99. When the lever is moved slightly to the right so that the detent 100 enters the notch 102 the left hand collar $f$ of the mechanism and the bolt controlling part carried thereby will have positions such as to just withdraw the bolt for positively locking the clutch of the reversed gear, leaving the latter only in frictional engagement. Further movement of the controlling lever 97 to bring the detent $100^a$ into the notch $n$ in the plate 99 insures an entire release of all of the clutches. A further forward movement of the lever whereby the detent 100 engages in the notch 103 results in bringing the clutch of which member $c$ is a part into frictional engagement only for the lowest speed forward driving; and when the detent moves into the notch 104, the mechanism in the stated clutch is in positively interlocked condition, which may be followed by moving the lever to bring the detent into the notch 105 by insuring to the stated clutch its frictional engagement only, the positive locking bolt for this clutch being withdrawn from its locking engagement. Further carrying the lever to bring detent $100^a$ into the notch 102 insures that all clutches are open or released.

When detent 100 moves into notch 107, the clutch for the intermediate speed gearing is in frictional engagement followed by the additional positive locking engagement when the detent enters notch 108, such locking engagement being thrown out when the detent enters notch 109 which leaves the stated clutch still frictionally set. Again the clutches are all released when the detent $100^a$ engages in the notch $n^3$, and still further when the lever is moved to bring the detent 100 carried thereby into the notch 101, the highest speed forward driving gearing is frictionally in clutch which may be followed by the additional positive lock clutching by positioning the lever so that its detent 100 engages in the notch 112.

It is the point or elongated portion of the cam 94 in coaction with one of the arms of either of the angular levers that is instrumental in setting the proper one of the clutches frictionally or both frictionally and positively locked,—such cam in operating having through the actuating connections therefor a movement of about ⅞ of a revolution. And while the most elongated portion of the cam may be operated to set in clutch any one of the desired clutch devices, the head or rounded portion of the cam remains in such a restraining engagement with the lever opposite the one the cam point engages as to assure that the other clutches must for the time and until wilfully and positively operated remain open.

The controlling means illustrated in Fig. 10 is simple, capable of being operated for a protracted time without material wear or derangement, and is operatively reliable; but certain departments of this invention are not dependent necessarily on having this particular controlling mechanism combined therewith.

I claim:—

1. In a variable speed transmission mechanism, a transmission shaft and a countershaft, a circular clutch member rotatively free on the transmission shaft, gearing connecting the countershaft and said clutch member, a support mounted on and non-rotative relatively to the transmission shaft and carrying a fellow clutch member for coaction with the said first clutch member, a collar having a clutch device operating member, a slide movable parallel with the transmission shaft, having a member engaging for endwise movements, only, the said collar, a rock shaft having an arm engaging said slide and having an angular lever, a revoluble cam coacting with said angular lever, and means for turning said cam and correspondingly positioning the said collar.

2. In a variable speed transmission mechanism, a transmission shaft and a countershaft, a plurality of circular clutch members rotatively free on the transmission shaft, variable speed gearing in sets connecting the countershaft and said clutch members, supports mounted on and non-rotative relatively to the transmission shaft and each carrying fellow clutch devices for coaction with the said clutch members, collars, one of each located between a pair of the clutch members having clutch device operating members, slides movable parallel with the transmission shaft having members engaging for endwise movements, only, the said collars, oppositely located rock shafts having arms engaging said slides and having angular levers, a revoluble cam located between said angular levers and coacting with both thereof, and means for positioning said cam and correspondingly positioning the said collars.

3 In a variable speed transmission mechanism, a transmission shaft and a countershaft, a plurality of circular clutch members rotatively free on the transmission shaft, variable speed gearing in sets connecting the countershaft and said clutch members, supports mounted on and non-rotative relatively to the transmission shaft and each carrying contributory clutch devices for coaction with the said clutch members, collars, one of each located between a pair of the clutch members having clutch device operating members, slides movable parallel with the transmission shaft having members engaging for endwise movements, only, the said collars, oppositely located rock shafts having arms engaging said slides and having angular levers, a rotative shaft having a cam located between said angular levers and coacting with both thereof, and a pinion on said cam shaft, a sector gear meshing with said pinion, and means for swinging said sector gear.

4. In a variable speed transmission mechanism, a transmission shaft and a countershaft, a plurality of circular clutch members rotatively free on the transmission shaft, variable speed gearing in sets connecting the countershaft and said clutch members, supports mounted on and non-rotative relatively to the transmission shaft and each carrying contributory clutch devices for coaction with the said clutch members, collars, one of each located between a pair of the clutch members having clutch device operating members, slides movable parallel with the transmission shaft having members engaging for endwise movements, only, the said collars, oppositely located rock shafts having arms engaging said slides and having angular levers, a rotative shaft having a cam located between said angular levers and coacting with both thereof, and a pinion on said cam shaft, a sector gear meshing with said pinion, an arc shaped plate having detent notches therein, a lever fulcrumed to swing alongside said plate, and having a spring detent for engagement in said notches, and a link connecting said lever and said sector gear.

5. In a variable speed transmission and controlling mechanism, in combination, two shafts having sets of differently proportioned gears connecting the one with the other, and each set having appurtenant thereto, a clutch comprising frictional, and positively-locking, clutch members, and means individual to each clutch for placing it free, for placing it frictionally clutched, and for placing it additionally lock clutched, and a controlling lever coacting with the clutch operating means and so operative that a degree of movement of such lever will first cause a frictional setting of a given clutch, and a further degree of movement of such lever will cause the additional positively locking of the clutch continued movements of said lever in succession releasing one of the clutches, and frictionally, and then positively lock-setting the next clutch.

Signed by me at Boston, Mass. in presence of two subscribing witnesses.

ALBERT LATHAM.

Witnesses:
RICHARD F. MURPHY,
J. W. NOONBORNE.